(No Model.)
E. H. GABUS.
SAW.
No. 277,021. Patented May 8, 1883.
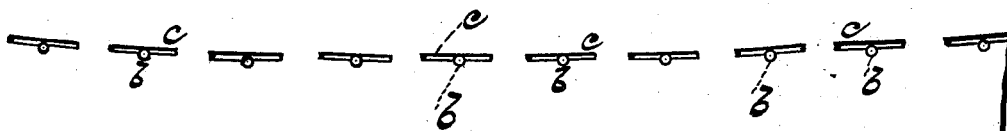
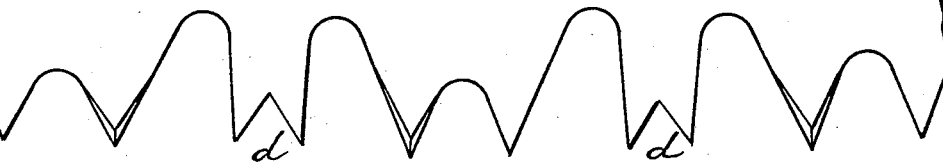
WITNESSES
Philip Masi.
James J. Sheehy.
INVENTOR
E. H. Gabus.
by Wm. H. Bates & Co.
his ATTORNEYS

UNITED STATES PATENT OFFICE.

EMILE H. GABUS, OF STRYKER, OHIO.

SAW.

SPECIFICATION forming part of Letters Patent No. 277,021, dated May 8, 1883.

Application filed March 1, 1883. (No model.)

*To all whom it may concern:*

Be it known that I, EMILE H. GABUS, a citizen of the United States, residing at Stryker, in the county of Williams and State of Ohio, have invented certain new and useful Improvements in Saws, of which the following is a specification, reference being had therein to the accompanying drawings.

This invention relates to saws, and it is an improvement on Letters Patent granted to me by the United States on the 23d day of January, 1883, and numbered 271,056; and the invention consists in providing a saw-blade with guide-marks, or short grooves having in their center a mark or indentation extending at right angles to the groove-mark that runs parallel with the points of the teeth, which serve as a guide for gaging the teeth when the saw is sharpened, thereby preserving the original set curve or configuration of the same, all as will be hereinafter more fully explained, and pointed out in the claims appended.

The annexed drawings, to which reference is made, fully illustrate my invention, in which—

Figure 1 represents a saw-blade having cutting-teeth only, with my improvement applied thereto; and Fig. 2 represents a saw-blade having cutting-teeth, and also drag or clearing teeth, with my guide-marks applied to the blade.

Referring to the accompanying drawings by letter, A designates the saw-blade, and $a$ the cutting-teeth, which are of equal height and the same distance apart as saws are usually constructed. On the saw-blade A, I provide a number of marks or indentations, $b$, corresponding with the number of teeth $a$, which marks connect with short grooves $c$, running parallel with the points of the teeth $a$, and are arranged in the center of said grooves at right angles thereto, and connecting therewith, as shown in the drawings. These guide-marks are cut, punched, or otherwise formed on the blade a sufficient depth therein to serve as a rest and guide for one end or point of a pair of dividers or other suitable gage, by means of which the teeth are measured when being filed. In adjusting or resharpening the saw one point of said dividers is placed in the guide-mark directly opposite the tooth to be measured, while the other point of the same is adjusted to reach the point of the tooth to be sharpened, which operation is performed in the usual manner until the tooth is reduced and its point coincides with the point of the dividers. Usually the tooth most worn will be taken as a guide, and the other teeth will be filed sufficiently to correspond thereto, and the teeth can be measured while filing the same, thus bringing all the teeth to an equal length, and at the same time preserving the original curvature.

It will be seen that in Fig. 2 of the drawings the cutting-edge of the saw-blade is provided with drag or clearing teeth $d$, which are usually shorter in length than the cutting-teeth, and therefore I provide for this difference in length by forming the grooves and indentation somewhat out of line with the cutting-teeth grooves, thus providing a means for measuring the drag or clearing teeth when the same are filed, as shown in Fig. 2 of the drawings.

It will be further observed by the above description, and by reference to the drawings, that the indentation and grooves are simply depressions made in the saw-blade, thus causing no weakening whatsoever to the blade, and the center marks or indentations are in radial lines with the points of the teeth and directly opposite the center of each tooth, and serve to indicate clearly where the point of the measuring-instrument is to be placed when gaging the teeth.

Should the relative position of the teeth change to one side or the other from the center marks by filing or gumming, said teeth can be gaged from either of said center marks or indentations corresponding with the center of the tooth.

In practice I have found that grooves alone do not clearly indicate the center of the teeth, and measurement cannot be accurately performed, and also the center marks or indentations alone do not provide a true rest for the dividers, nor could the teeth be accurately measured after their positions were altered by filing; and to overcome these obstructions I form a combination of center mark and longitudinal groove running parallel with the teeth, which presents a perfect guide, whereby the teeth can be accurately measured and gaged. Should it be desirable, the grooves opposite the clearing or drag teeth, Fig. 2, may be separated in the center, thus forming two short grooves and two indentations for each point of said clearing-tooth.

Having thus described my present invention, what I claim, and desire to secure by Letters Patent, is—

1. The saw-blade A, provided on its face with short grooves $c$, parallel with the points of the teeth $a$, and having a center mark or indentation communicating therewith, substantially as described, and for the purposes specified.

2. A saw-blade provided with the groove $c$ and indentations $b$, constructed in line parallel to the teeth, as described, whereby the length of teeth may be gaged while filing, as set forth.

3. In a saw having irregular teeth, or of different length, the combination therewith of the short grooves provided with the central marks, $b$, arranged parallel with the teeth or the point of the same, said marks in rear of the shortest teeth being out of line with the marks of the longest teeth, substantially as shown and described.

4. In a saw, the same provided with guide-marks for measuring and gaging the teeth when filing the same, consisting of a groove formed in the face of the blade, as shown, opposite each tooth of the saw, and provided with a central indentation or mark, $b$, that is arranged opposite each tooth-point, for the purposes herein described.

5. In a saw-blade, the center marks, $b$, and grooves $c$, combined and arranged parallel with the point of the teeth on the face of the blade, substantially as herein described, and for the purpose specified.

6. As a new article of manufacture, a saw-blade having on its face longitudinal grooves parallel with the points of the teeth, said grooves having at their center an indentation or mark whereby the teeth of the saw may be measured and gaged to the proper height, as shown and described.

In testimony whereof I affix my signature in presence of two witnesses.

EMILE H. GABUS.

Witnesses:
W. B. KITZMILLER,
PAUL GABUS.